(12) United States Patent
Kim

(10) Patent No.: US 11,129,000 B2
(45) Date of Patent: Sep. 21, 2021

(54) METHOD AND SYSTEM FOR INTEGRATEDLY MANAGING VEHICLE OPERATION STATE

(71) Applicant: THINKWARE CORPORATION, Gyeonggi-do (KR)

(72) Inventor: DaeWon Kim, Gyeonggi-do (KR)

(73) Assignee: THINKWARE CORPORATION, Seongnam-si (KR)

( * ) Notice: Subject to any disclaimer, the term of this patent is extended or adjusted under 35 U.S.C. 154(b) by 204 days.

(21) Appl. No.: 16/428,987

(22) Filed: Jun. 1, 2019

(65) Prior Publication Data
US 2019/0289446 A1 Sep. 19, 2019

Related U.S. Application Data

(63) Continuation of application No. PCT/KR2017/011834, filed on Oct. 25, 2017.

(30) Foreign Application Priority Data

Dec. 2, 2016 (KR) .................. 10-2016-0163391
Dec. 6, 2016 (KR) .................. 10-2016-0164852
Apr. 10, 2017 (KR) .................. 10-2017-0046097

(51) Int. Cl.
*H04W 4/44* (2018.01)
*H04W 80/12* (2009.01)
(Continued)

(52) U.S. Cl.
CPC .............. *H04W 4/44* (2018.02); *G07C 5/008* (2013.01); *G07C 5/02* (2013.01); *G07C 5/08* (2013.01);
(Continued)

(58) Field of Classification Search
USPC ........................................ 701/31.4
See application file for complete search history.

(56) References Cited

U.S. PATENT DOCUMENTS 9,449,495 B1 9/2016 Call et al.
10,212,571 B2 2/2019 Lee et al.
(Continued)

FOREIGN PATENT DOCUMENTS

CN 103632573 A 3/2014
CN 104054118 A 9/2014
(Continued)

OTHER PUBLICATIONS

EP Application No. 17875710, Supplemental European Search Report dated Mar. 24, 2020, 2 pages.
(Continued)

*Primary Examiner* — Tyler D Paige
(74) *Attorney, Agent, or Firm* — Westerman, Hattori, Daniels & Adrian, LLP

(57) ABSTRACT

Methods and systems are provided for integratedly managing a vehicle operation state. A vehicle integration management method performed by a server implemented by using a computer may include receiving vehicle operation data related to an operation state of the vehicle from a vehicle terminal mounted or embedded in the vehicle; and providing a service related to the vehicle operation data through a dedicated application on a user terminal used by a user of the vehicle. The providing may provide at least one of an operation report, a parking impact notification, and an accident situation notification based on the vehicle operation data in association with the application.

17 Claims, 11 Drawing Sheets

(51) Int. Cl.
    *H04M 1/725*       (2021.01)
    *G08G 1/14*         (2006.01)
    *G07C 5/00*         (2006.01)
    *G07C 5/02*         (2006.01)
    *G08G 1/00*         (2006.01)
    *G07C 5/08*         (2006.01)
    *H04W 4/00*        (2018.01)

(52) U.S. Cl.
    CPC .............. *G08G 1/14* (2013.01); *H04M 1/725* (2013.01); *H04W 4/00* (2013.01); *H04W 80/12* (2013.01)

(56) References Cited

U.S. PATENT DOCUMENTS

| | | | | |
|---|---|---|---|---|
| 10,785,604 B1* | 9/2020 | Kumar | ................... | H04W 4/027 |
| 2008/0255722 A1* | 10/2008 | McClellan | ............. | G07C 5/008 |
| | | | | 701/31.4 |
| 2010/0087984 A1* | 4/2010 | Joseph | ................... | G09B 19/16 |
| | | | | 701/31.4 |
| 2013/0144471 A1 | 6/2013 | Hyun-Suk | | |
| 2013/0317693 A1* | 11/2013 | Jefferies | ................. | G07C 5/008 |
| | | | | 701/31.5 |
| 2015/0183441 A1* | 7/2015 | Aoki | ...................... | G08G 1/167 |
| | | | | 434/62 |
| 2016/0061625 A1 | 3/2016 | Sunlin | | |
| 2017/0053461 A1* | 2/2017 | Pal | ........................ | H04W 4/027 |

FOREIGN PATENT DOCUMENTS

| | | |
|---|---|---|
| CN | 105243702 A | 1/2016 |
| CN | 105976450 A | 9/2016 |
| EP | 2 652 718 A1 | 10/2013 |
| KR | 10-2009-0116538 A | 11/2009 |
| KR | 10-2011-0017339 A | 2/2011 |
| KR | 10-1121830 B1 | 3/2012 |
| KR | 10-1237991 B1 | 3/2013 |
| WO | 2012/080741 A1 | 6/2012 |

OTHER PUBLICATIONS

Office Action dated May 8, 2021, issued in counterpart CN application No. 201780074615.0, with English translation. (33 pages).

* cited by examiner

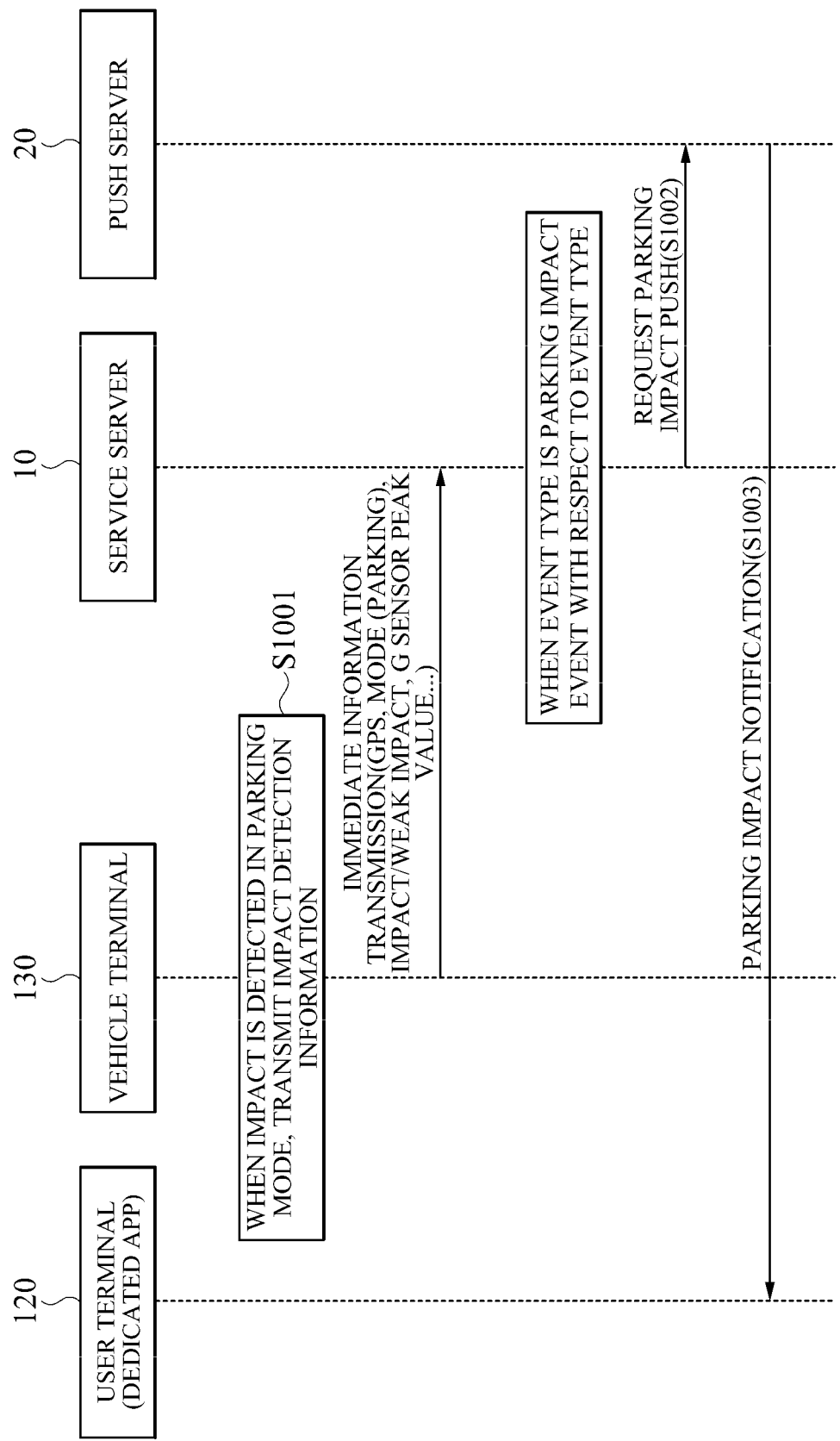

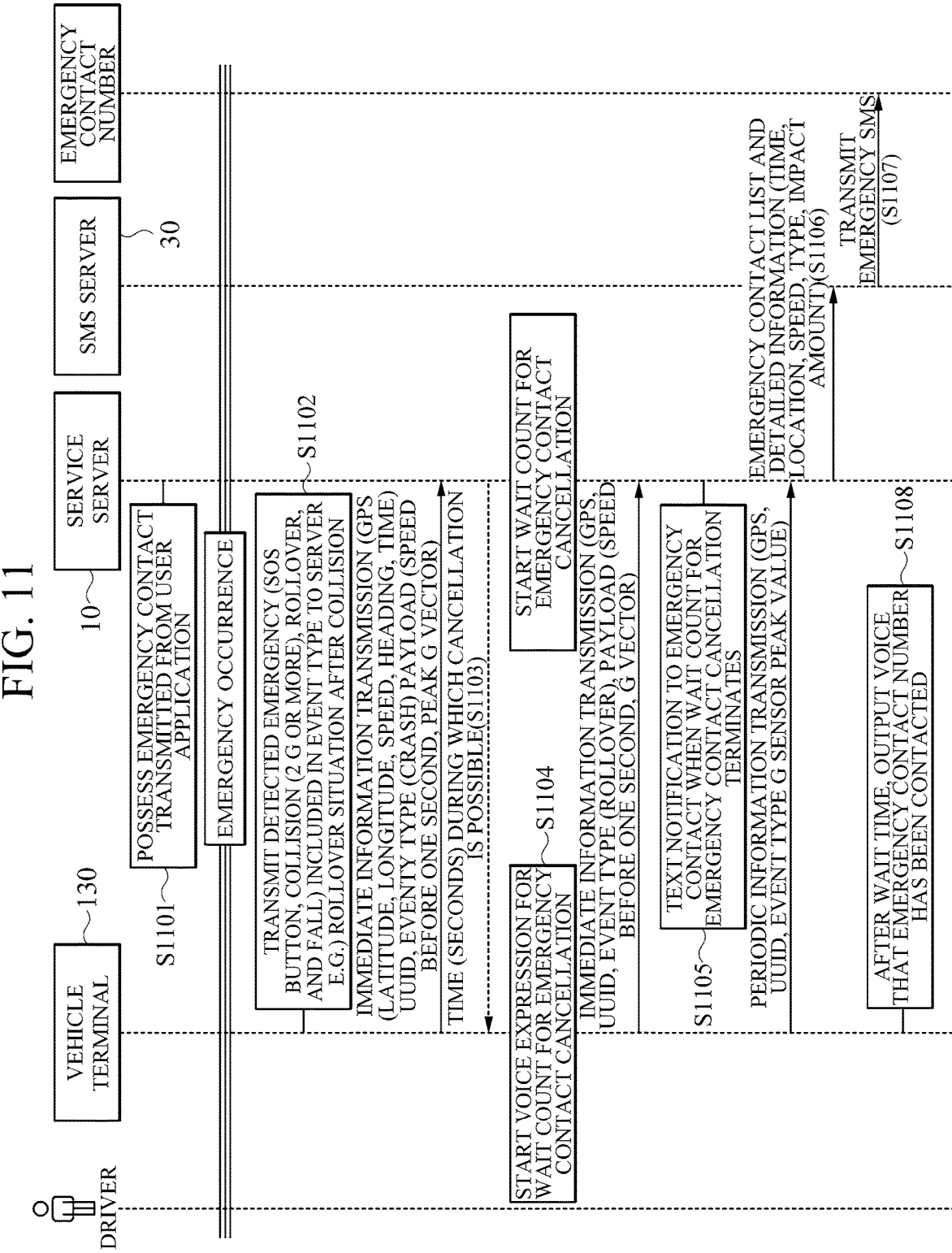

METHOD AND SYSTEM FOR INTEGRATEDLY MANAGING VEHICLE OPERATION STATE

RELATED APPLICATIONS

This application is a continuation under 35 U.S.C. § 365 to International PCT Application No. PCT/KR2017/011834 filed Oct. 25, 2017, which claims priority to Korean Application No. 10-2016-0163391 filed Dec. 2, 2016, Korean Application No. 10-2016-0164852 filed Dec. 6, 2016, and Korean Application No. 10-2017-0046097 filed Apr. 10, 2017. The disclosure of each is incorporated herein in its entirety by reference.

TECHNICAL FIELD

The present invention relates to a technology for integratedly managing a vehicle operation state.

BACKGROUND

With the convergence of information and communication technology in a vehicle field, various methods are being developed to remotely monitor and manage operation information or accident record information of each vehicle.

As an example of the vehicle management technology, Korean Patent Laid-Open Publication No. 10-2005-0008122 (published on Jan. 21, 2005) discloses a vehicle management system of receiving GPS information at a predetermined time from a GPS satellite, generating a current location of a vehicle, storing the current location in a location information storage device, when the vehicle arrives at a predetermined destination, detecting current location information and reflecting the current location information to a vehicle operation, and a method thereof.

Recently, the IT technology introduced in various electronic devices such as a car video recorder, a navigation device, a smart phone, a tablet PC, etc. used during the vehicle operation has been advanced, and implementation of a new function is required through connectivity with a vehicle suitable thereto.

SUMMARY

According to an exemplary embodiment of the present invention, a method of integratedly managing a vehicle performed by a server implemented using a computer includes receiving vehicle operation data related to an operation state of the vehicle from a vehicle terminal mounted or embedded in the vehicle; and providing a service related to the vehicle operation data through a dedicated application on a user terminal used by a user of the vehicle, wherein the providing includes: providing at least one of an operation report, a parking impact notification, and an accident situation notification based on the vehicle operation data in association with the application.

The vehicle terminal may periodically transmit GPS information including speed information to the server, and the providing may include estimating a mileage of the vehicle using the GPS information periodically received from the vehicle terminal for the operation report.

The method may further include transmitting, to the vehicle terminal, a communication configuration information including a type of data required for the service and a transmission period when the server is connected to the vehicle terminal. The vehicle terminal may transmit the vehicle operation data of a predetermined type at a predetermined period to the server through the communication configuration information.

The transmission period of the vehicle operation data may be set shorter than another mode in a normal mode in which the vehicle is running.

The vehicle terminal may transmit the vehicle operation data including information about an event to the server at a time when at least one of a speeding event, a rapid acceleration event, a rapid braking event, and a rapid turn event is detected in the normal mode in which the vehicle is running, and the providing may include providing an operation report evaluated based on the vehicle operation data accumulated for each event through the application.

The vehicle terminal may transmit the vehicle operation data including information about an impact event to the server at a time when the impact event is detected in a parking mode, and the providing may include providing a parking impact notification through the application for the impact event.

The providing of the parking impact notification may include receiving an image at a time when the impact event is detected from the vehicle terminal and providing the image together with the parking impact notification.

The vehicle terminal may transmit the vehicle operation data including information about an accident occurrence event to the server at a time when the accident occurrence event is detected in a normal mode in which the vehicle is running, and the providing may include transmitting an accident situation notification to an emergency contact set through the application for the accident occurrence event.

The transmitting of the accident situation notification may include starting a wait count for a predetermined time in which an emergency notification cancellation is possible for the accident occurrence event, and if there is no user input for the emergency notification cancellation within the predetermined time, transmitting the accident situation notification after the wait count terminates.

The transmitting of the accident situation notification may include transmitting the accident situation notification including detailed information of at least one of a location and a time of occurrence of an accident situation, a type of the accident occurrence, a speed just before the occurrence of the accident situation, and an impact magnitude based on the vehicle operation data including the information about the accident occurrence event.

According to another exemplary embodiment of the present invention, there is provided a computer program stored in a computer-readable recording medium for executing a method of integratedly managing a vehicle in combination with a user terminal implemented using a computer, wherein the method of integratedly managing the vehicle includes, when the user terminal is connected to a vehicle terminal mounted or embedded in the vehicle, the user terminal mutually exchanging identification information and storing the identification information according to control of a driven application; and the user terminal receiving contents, from a server related to the application, provided based on vehicle operation data of the vehicle received by the server from the vehicle terminal with regard to the identification information of the vehicle terminal stored in the user terminal, under the control of the application.

The receiving of the contents may include the user terminal requesting location information of the vehicle from the server under the control of the application; the user terminal receiving the location information of the vehicle from the server under the control of the application; and the user terminal displaying the location information of the vehicle using a map under the control of the application.

The receiving of the contents may include the user terminal transmitting a configuration for a geo-fencing area to the server under the control of the application; and the user terminal receiving and outputting a notification of the geo-fencing area provided in the server based on the configuration under the control of the application.

The application may provide at least one of a function of selecting a center location and a radius to designate the geo-fencing area, a function of setting a notification type for the geo-fencing area, a function of setting a repetition period of a notification, a time band or an expiration period for the geo-fencing area, and a function of providing a geo-fencing area list and editing an item of the list.

The receiving of the contents may include the user terminal transmitting an inquiry request for an operation report for the vehicle to the server under the control of the application; and the user terminal receiving, from the server, and outputting an operation report evaluated based on the vehicle operation data under the control of the application.

The receiving of the contents may include the user terminal receiving and outputting a parking impact notification provided when the server receives vehicle operation data including information about a parking impact event from the vehicle terminal under the control of the application.

The receiving of the contents may further include the user terminal receiving, from the server, an image provided at a time when the parking impact event is detected in the vehicle terminal together with the parking impact notification under the control of the application.

The method of integratedly managing the vehicle may further include the user terminal setting an emergency contact for transmitting an accident situation notification when the server receives vehicle operation data including information about an accident occurrence event from the vehicle terminal under the control of the application.

The method of integratedly managing the vehicle may further include the user terminal selecting and connecting one or more vehicle terminals among a plurality of vehicle terminals under the control of the application.

According to another exemplary embodiment of the present invention, a vehicle integration management system of a server implemented using a computer includes at least one processor implemented to execute a computer readable instruction. The at least one processor processes a process of receiving vehicle operation data related to an operation state of the vehicle from a vehicle terminal mounted or embedded in the vehicle. The system includes a process of providing a service related to the vehicle operation data through a dedicated application on a user terminal used by a user of the vehicle, and the providing includes providing at least one of an operation report, a parking impact notification, and an accident situation notification based on the vehicle operation data in association with the application.

An object of some embodiments of the present invention is to provide a method and a system for integratedly managing a vehicle operation state including an operation report of a vehicle, a parking impact or an emergency, etc.

According to some embodiments of the present invention, it is possible to more precisely and specifically understand a vehicle operation state by integratedly managing the vehicle operation state including an operation report of a vehicle, a parking impact or an emergency, etc., and it is possible to further appropriately and quickly to take a measure corresponding to the vehicle operation state.

BRIEF DESCRIPTION OF THE DRAWINGS

FIG. 10 is a diagram for explaining an example of a parking impact notification process according to an embodiment of the present invention.

FIG. 11 is a diagram for explaining an example of an emergency notification process according to an embodiment of the present invention.

DETAILED DESCRIPTION

Hereinafter, some embodiments of the present invention will be described in detail with reference to the accompanying drawings.

Embodiments of the disclosure relate to a technology for integratedly managing a state of a vehicle in operation.

Embodiments, including those specifically disclosed herein, may manage a vehicle operation state, thereby enabling rapid response to a hazardous situation, such as a vehicle collision, as well as achieving considerable advantages in terms of accuracy, quickness, efficiency, convenience, cost savings, etc.

Figure 1:
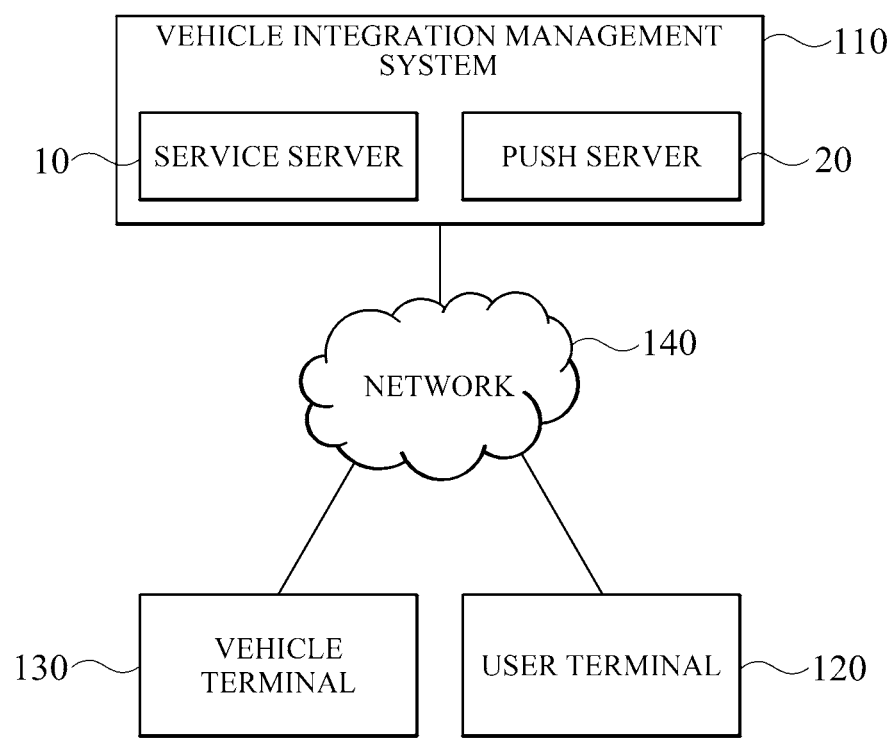
FIG. 1 is a diagram illustrating an example of a network environment according to an embodiment of the present invention.

FIG. 1 is a diagram illustrating an example of a network environment according to an embodiment of the present invention. FIG. 1 shows an example in which the network environment includes a vehicle integration management system 110, a user terminal 120, a vehicle terminal 130, and a network 140.

The user terminal 120 may be a terminal used by a user who is a driver of a vehicle, and may be a mobile terminal implemented as a computer device. Examples of the user terminal 120 include a smart phone, a mobile phone, a tablet PC, a wearable device, a notebook, a digital broadcast terminal, a PDA (personal digital assistant), a PMP (portable multimedia player), etc. As an example, the user terminal 120 may communicate with the vehicle terminal 130 and/or the vehicle integration management system 110 via the network 140 using a wireless or wired communication method. The user terminal 120 may refer to all terminal devices capable of installing and executing a dedicated application related to the vehicle integration management system 110. At this time, the user terminal 120 may perform entire service operations such as service screen configuration, data input, data transmission/reception, data storage, etc. under the control of the dedicated application.

The vehicle terminal 130 may be a terminal implemented as a computer device and may mean an electronic device mounted or embedded in the vehicle. The vehicle terminal 130 may be an OE (OEM Pre-Installed) terminal mounted or embedded in the vehicle by a vehicle manufacturer at the time of vehicle release, or an AM (After Market) terminal individually installed or embedded by the vehicle driver after the vehicle release. Examples of the vehicle terminal 130 include a car video recorder, a navigation device, a VSM (Vehicle Status Monitoring) terminal, and the like. The vehicle terminal 130 may communicate with the vehicle integration management system 110 and/or the user terminal 120 via the network 140 using a wireless or wired communication method.

The vehicle integration management system 110 may be implemented as a computer device or a plurality of computer devices that communicate with the user terminal 120 and/or the vehicle terminal 130 via the network 140 to provide instructions, codes, files, contents, services, etc.

The vehicle integration management system 110 serves as a platform for providing a vehicle integration management service to the user terminal 120 that is a client having a dedicated application installed therein. The vehicle integration management system 110 may execute one or more processes configured to perform one or more characteristics described herein. In particular, the vehicle integration management system 110 may process information obtained from the user terminal 120 and/or the vehicle terminal 130 to provide a service, and, for example, monitor a vehicle operation state to take a measure corresponding to the vehicle operation state.

For example, the vehicle integration management system 110 may include a service server 10 for providing the vehicle integration management service based on information acquired from the user terminal 120 and/or the vehicle terminal 130, and a push server 20 for transmitting a push notification related to the vehicle integration management service to the user terminal 120. The service server 10 and the push server 20 may be implemented as a single integrated system or as separate systems to operate in an interactive manner. In the following embodiment, it is described that the service server 10 and the push server 20 are implemented as separate systems, but the present invention is not limited thereto.

The vehicle integration management system 110 corresponds to a server computer. Examples of the server computer may include a server computing device, a personal computer, a server computer, a series of server computers, a minicomputer, and/or a mainframe computer but are not limited thereto. The server computer may be a distributed system, and operations of the server computer may be executed concurrently and/or sequentially on one or more processors.

For example, under the control of an operating system (OS) included in the user terminal 120 in which the dedicated application is installed or at least one program (for example, a browser or the installed application), the user terminal 120 may access the vehicle integration management system 110 to receive a service and contents provided by the vehicle integration management system 110. For example, if the user terminal 120 transmits a service request message to the vehicle integration management system 110 via the network 140 under the control of the application, the vehicle integration management system 110 may transmit a code corresponding to the service request message to the user terminal 120. The user terminal 120 may provide contents to the user by configuring and displaying a screen corresponding to the code under the control of the application.

The communication method is not limited, and may include not only a communication method using a communication network (e.g., a mobile communication network, a wired Internet, a wireless Internet, and a broadcasting network) that the network 140 may include but also short-range wireless communication between devices. For example, the network 140 may include any one or more networks among a personal area network (PAN), a local area network (LAN), a campus area network (CAN), a metropolitan area network (MAN), a wide area network (WAN), a broadband network (BBN), a network such as the Internet, and the like. In addition, the network 140 may include any one or more of network topology including a bus network, a star network, a ring network, a mesh network, a star-bus network, a tree or a hierarchical network, etc. but is not limited thereto.

Figure 2:
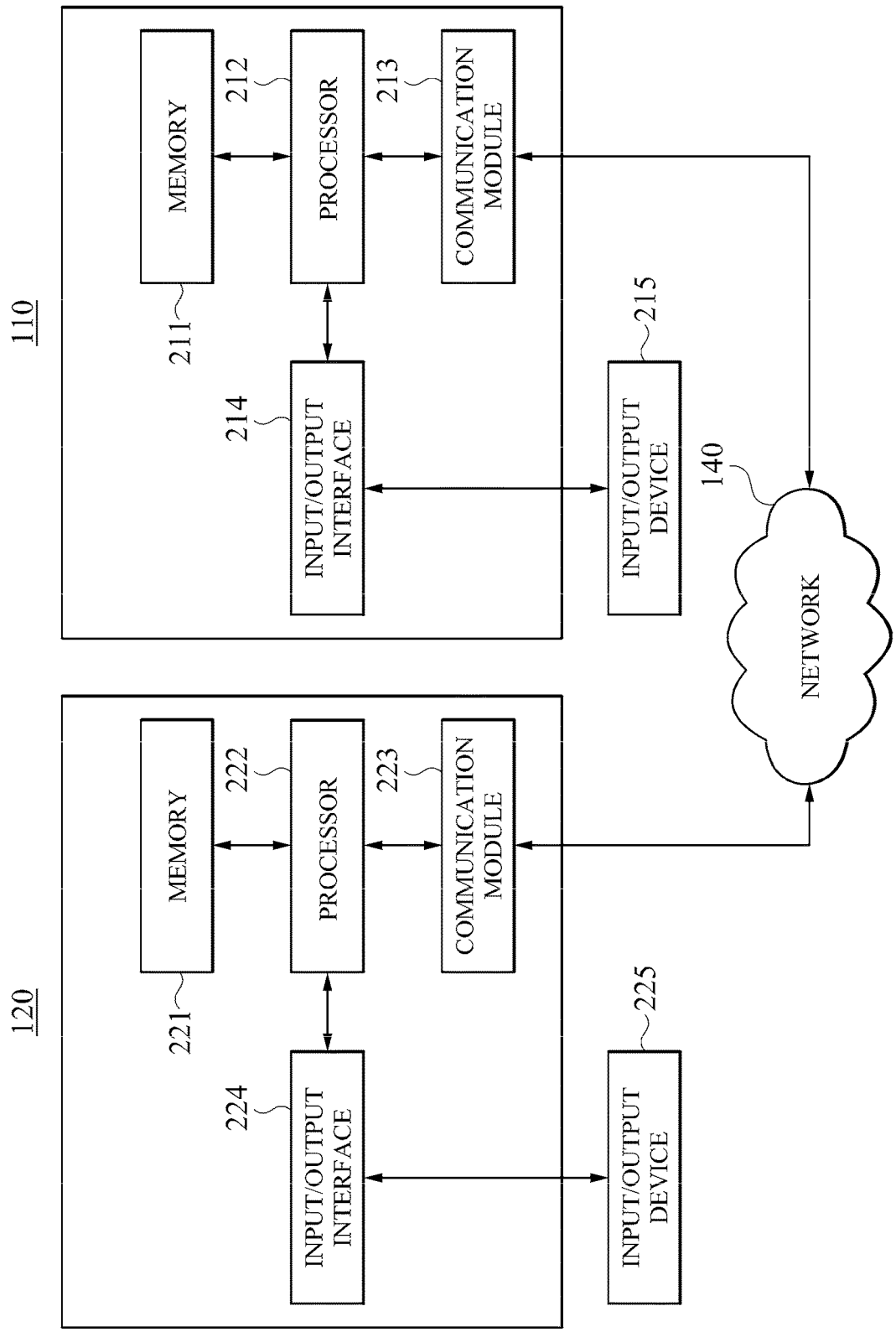
FIG. 2 is a block diagram illustrating internal configurations of a user terminal and a vehicle integrated management system according to an embodiment of the present invention.

FIG. 2 is a block diagram for explaining internal configurations of a user terminal and a vehicle integration management system according to an embodiment of the present invention. In FIG. 2, the internal configurations of the user terminal 120 and the vehicle integration management system 110 will be described. The vehicle terminal 130 that is another electronic device may also have the same or similar internal configuration as the user terminal 120 and the service server 10 and the push server 20 belonging to the vehicle integration management system 110 may also have the same or similar internal configuration.

The vehicle integration management system 110 and the user terminal 120 may include memories 211 and 221, processors 212 and 222, communication modules 213 and 223 and input/output interfaces 214 and 224. The memories 211 and 221 may be a computer readable recording medium and may include a permanent mass storage device such as a random access memory (RAM), a read only memory (ROM), and a disk drive. The memory 211 or 221 may store an operating system or at least one program code (e.g., a code for an application installed and driven in the user terminal 120). These software components may be loaded from the computer readable recording medium separate from the memories 211 and 221. The separate computer readable recording medium may include a computer readable recording medium such as a floppy drive, a disk, a tape, a DVD/CD-ROM drive, a memory card, etc. In another embodiment, the software components may be loaded into the memories 211 and 221 through the communication modules 213 and 223 rather than the computer readable recording medium. For example, at least one program may be loaded into the memories 211 and 221 based on a program (e.g., the application described above) installed by files provided by developers or a file distribution system that distributes installation files of applications via the network 140.

The processors 212 and 222 may be configured to process instructions of a computer program by performing basic arithmetic, logic, and input/output operations. The instructions may be provided to the processors 212 and 222 by the memories 211 and 221 or the communication modules 213 and 223. For example, the processors 212 and 222 may be configured to execute the instructions received in accordance with a program code stored in a recording device, such as the memories 211 and 221.

The communication modules 213 and 223 may provide functions for the vehicle integration management system 110 and the user terminal 120 to communicate with each other via the network 140 and may provide functions for communicating with another electronic device (e.g. the vehicle terminal 130). In an example, a request (e.g., a search request) generated by the processor 222 of the user terminal 120 in accordance with the program code stored in the recording device, such as the memory 221, may be transmitted to the vehicle integration management system 110 via the network 140 under the control of the communication module 223

The input/output interfaces 214 and 224 may be means for interfacing with the input/output devices 215 and 225. For example, the input device may include a device such as a keyboard or a mouse, and the output device may include a device such as a display for displaying a communication session of the application. As another example, the input/output interface 224 may be a means for interfacing with a device in which functions for input and output are integrated into one, such as a touch screen. More specifically, the processor 222 of the user terminal 120 may display a service screen or contents configured by using data provided by the vehicle integration management system 110 or the vehicle terminal 130 on a display through the input/output interface 224 in processing instructions of the computer program loaded in the memory 221.

Further, in other embodiments, the vehicle integration management system 110 and the user terminal 120 may include more components than the components of FIG. 2. However, there is no need to clearly illustrate most components of the prior art. For example, the user terminal 120 may be implemented to include at least some of the input/output devices 225 described above, or may further include other components such as a transceiver, a Global Positioning System (GPS) module, a camera, various sensors, a database, etc. More specifically, when the user terminal 120 is a smart phone, it will be appreciated that various components such as an acceleration sensor, a gyro sensor, a camera, various physical buttons, a button using a touch panel, an input/output port, a vibrator for vibrator, etc. generally included in the smart phone may be implemented to be further included in the user terminal 120.

Hereinafter, a specific embodiment of a method and system for integratedly managing a vehicle operation state will be described.

The overall system configuration for integrated management of the vehicle operation state may include the vehicle integration management system 110, the user terminal 120, and the vehicle terminal 130.

The vehicle terminal 130 may be a communication terminal, which collects information related to the vehicle operation state from an internal sensor mounted on the terminal or an external sensor mounted on the vehicle and connected to the terminal and transmits the collected information to the vehicle integration management system 110 and/or the user terminal 120.

The user terminal 120 in which a dedicated application related to the vehicle integration management system 110 is installed and executed is necessary when using basic functions and communication related functions for vehicle integration management. The dedicated application executed in the user terminal 120 may select and manage one or more vehicle terminals 130.

The vehicle integration management system 110 may include the service server 10 that connects the dedicated application on the user terminal 120 and the vehicle terminal 130. At this time, the service server 10 may communicate with the vehicle terminal 130 to process acquired information and provide the service.

The vehicle integration management system 110 may include the push server 20 that is a push service interaction server for transmitting various push notifications related to the vehicle operation state to the user terminal 120.

First, a wireless communication environment process of the vehicle terminal 130 will be described as follows.

The vehicle terminal 130 may include a WiFi AP mode specification and initially operates in a WiFi AP mode. At this time, AP information may include an SSID (service set identification).

A user may input a SSID (service set identification) and a password of a WiFi to which the vehicle terminal 130 is to be connected through the user terminal 120.

The user terminal 120 may connect to the vehicle terminal 130 in the WiFi AP mode and transmit the SSID and the password of the WiFi to which the vehicle terminal 130 is to be connected. At this time, the vehicle terminal 130 may store corresponding WiFi connection information in a WiFi setup file.

If there is no WiFi setup file upon booting of the vehicle terminal 130, the vehicle terminal 130 is booted in the WiFi AP mode, and if there is the WiFi setup file, the vehicle terminal 130 may search for a designated WiFi network and may be connected thereto.

The vehicle terminal 130 may communicate directly with the vehicle integration management system 110 and/or the user terminal 120 via a WiFi network. A communication environment of the vehicle terminal 130 is not limited to the WiFi network. For example, when the user terminal 120 provides a tethering function, the vehicle terminal 130 may be connected to the user terminal 120 through a wireless connection such as radio frequency (RF) communication, NFC (Near Field Communication), Bluetooth, Zigbee, etc., or a wired connection such as a universal serial bus (USB), etc. such that the vehicle terminal 130 may be connected to the network 140 via the tethering function provided by the user terminal 120 to communicate with the vehicle integration management system 110.

Figure 3:
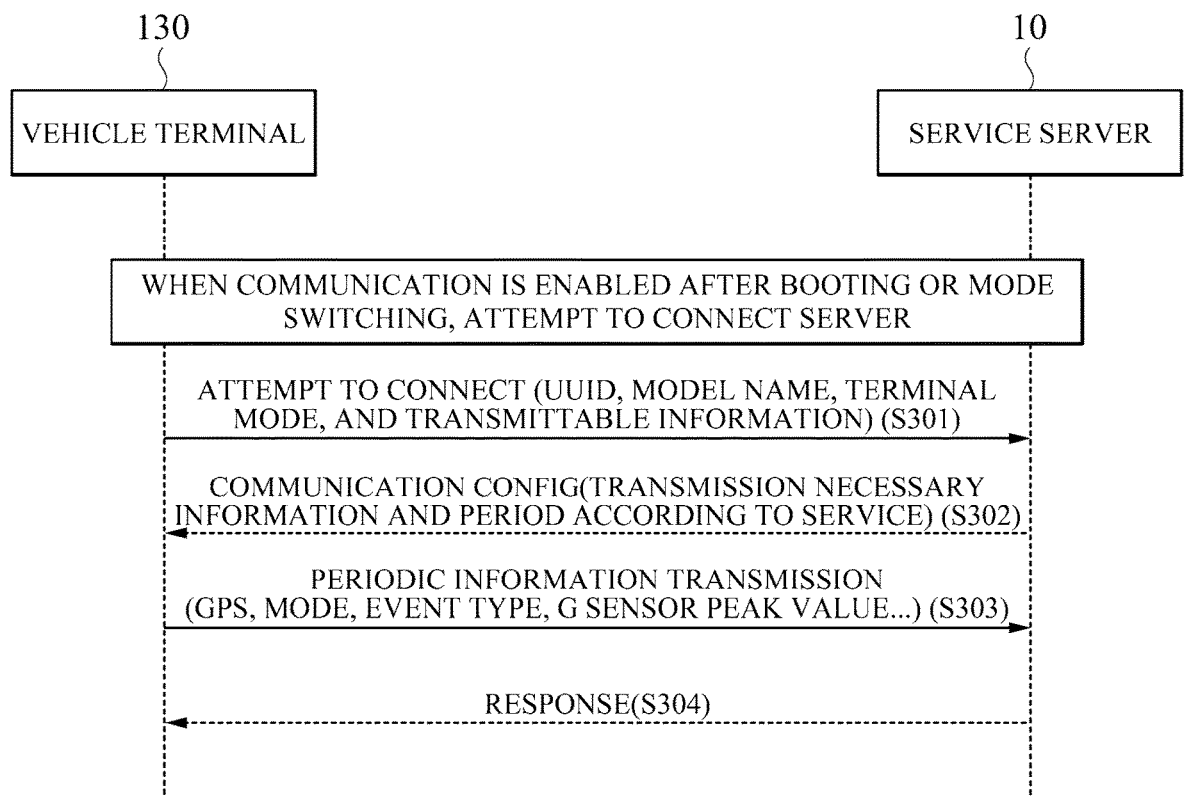
FIGS. 3 to 4 are diagrams for explaining examples of a basic communication process between a vehicle terminal and a service server according to an embodiment of the present invention.
Figure 4:
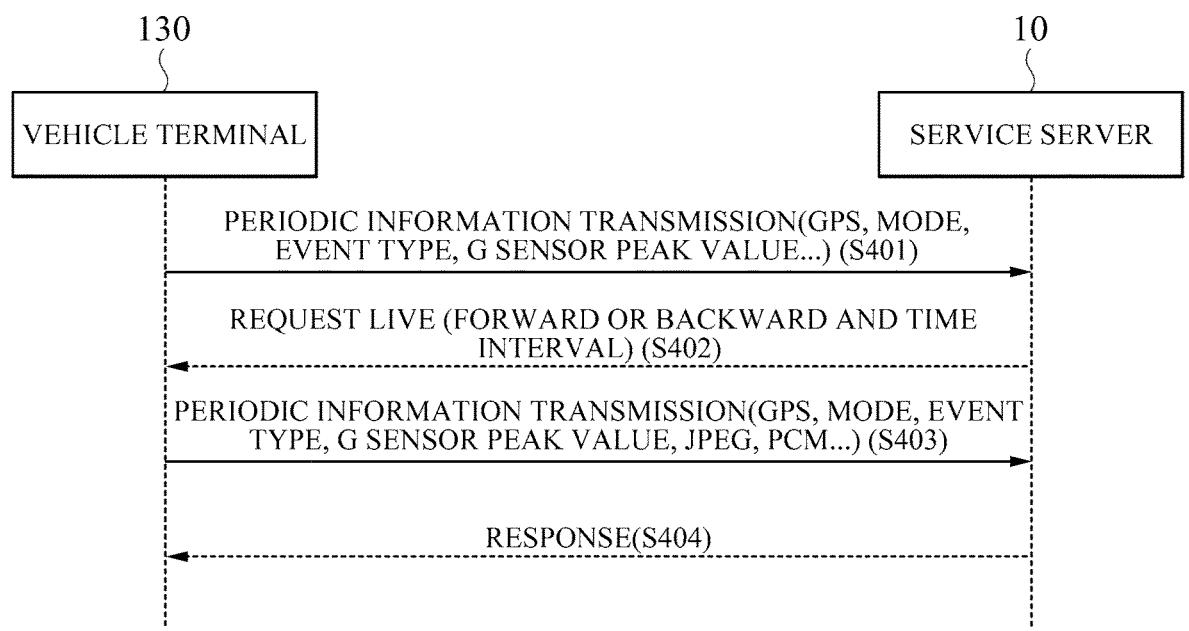

FIGS. 3 to 4 are diagrams for explaining examples of a basic communication process between a vehicle terminal and a service server according to an embodiment of the present invention.

As shown in FIG. 3, when communication is enabled after booting or mode switching, the vehicle terminal 130 attempts to connect the service server 10. At this time, the vehicle terminal 130 transmits a UUID (universally unique identifier), a model name, a terminal mode, transmittable information, etc. as data for connection attempt to the service server 10 (S301).

The service server 10 transmits communication configuration information to the vehicle terminal 130 in response to the connection attempt of the vehicle terminal 130 (S302). At this time, the communication configuration information may include a type and a period of data that need to be transmitted by the vehicle terminal 130 for service in relation to a vehicle operation state as necessary information for providing the service.

The vehicle terminal 130 periodically transmits the data (hereinafter referred to as "vehicle operation data") related to the vehicle operation state to the service server 10 in accordance with the communication configuration information requested by the service server 10 (S303). The vehicle operation data may include information that may be acquired through the vehicle terminal 130 and may include GPS information, a terminal mode (e.g., a parking mode, a driving mode, etc.), an event type, an acceleration sensor value (e.g., a G sensor peak value), and the like. The GPS information may include latitude, longitude, speed, heading, time information, and the like.

When the service server 10 receives the vehicle operation data periodically provided by the vehicle terminal 130, the service server 10 transmits a response to reception of the corresponding data to the vehicle terminal 130 (S304).

Communication between the vehicle terminal 130 and the service server 10 is continuously maintained or the vehicle terminal 130 resumes communication with the service server 10 periodically and repeats the above steps S303 to S304.

If there is information requested by the service server 10, the vehicle terminal 130 may transmit information requested by the service server 10 included in the periodically transmitted vehicle operation data.

As an example, as shown in FIG. 4, the service server 10 may receive the vehicle operation data from the vehicle terminal 130 (S401), and request live data, for example, a forward or a backward image of the vehicle, including at least one of video and audio as additional information to a specific event included in the vehicle operation data from the vehicle terminal 130 (S402).

The vehicle terminal 130 includes and transmits, to the service server 10, the live data (the forward or backward image of the vehicle, etc.) requested by the service server 10 in the vehicle operation data transmitted every predetermined period after receiving a request of the service server 10 (S403).

When the service server 10 receives the vehicle operation data including the live data requested by itself from the vehicle terminal 130, the service server 10 transmits a response to reception of the corresponding data to the vehicle terminal 130 (S404).

Accordingly, the service server 10 may set the type and the period (frequency) of the vehicle operation data to be transmitted by the vehicle terminal 130 through the communication configuration setting in response to initial communication of the vehicle terminal 130. At this time, the type and the period of the vehicle operation data may be set differently according to modes (for example, the parking mode, driving mode, etc.). Thereafter, the vehicle terminal 130 may transmit the vehicle operation data of a predetermined type to the service server 10 at a predetermined period unless there is a special event.

While communication between the vehicle terminal 130 and the service server 10 is disconnected, the vehicle operation data to be transmitted to the service server 10 is stored in a local of the vehicle terminal 130, and may be collectively transmitted when communication is connected.

Figure 5:
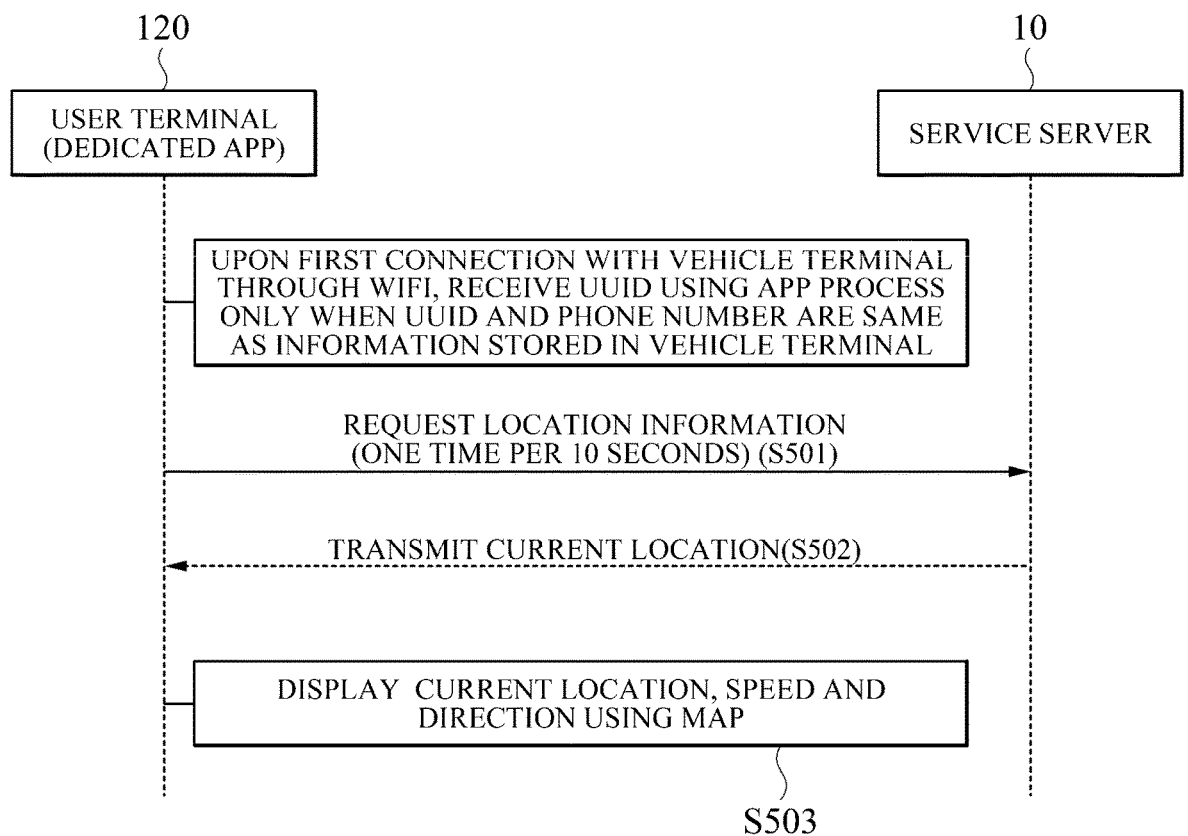
FIG. 5 is a diagram for explaining an example of a vehicle location determining process according to an embodiment of the present invention.

FIG. 5 is a diagram for explaining an example of a vehicle location determining process according to an embodiment of the present invention.

A dedicated application on the user terminal 120 may provide a function of determining a location of a vehicle.

As shown in FIG. 5, when a user interface for vehicle location determination provided by the dedicated application is selected by a user, the user terminal 120 may request the service server 10 to transmit location information of the vehicle at a predetermined period (e.g., 10 seconds) under the control of the dedicated application (S501). At this time, a UUID of the vehicle terminal 130 may be included in a request signal.

The service server 10 may transmit the location information obtained from the vehicle terminal 130 to the user terminal 120 in response to a request of the user terminal 120 (S502). In other words, the service server 10 may transmit the location information transmitted by the vehicle terminal 130 of the UUID included in the request of the user terminal 120 to the user terminal 120. At this time, the location information may include a current location of the vehicle, a speed and a direction.

The user terminal 120 may display the current location and the speed direction of the vehicle on a map based on the information received from the service server 10 under the control of the dedicated application (S503).

When the user terminal 120 is initially connected to the vehicle terminal 130, the user terminal 120 may exchange and store identification information (the UUID, a telephone number, etc.) with the vehicle terminal 130, and when the information stored in the user terminal 120 is the same as the information stored in the vehicle terminal 130, may perform the vehicle location determining process.

The user terminal 120 may stop relevant communication for the vehicle location determination when moving from a service screen for the vehicle location determination to another screen under the control of the dedicated application.

Figure 6:
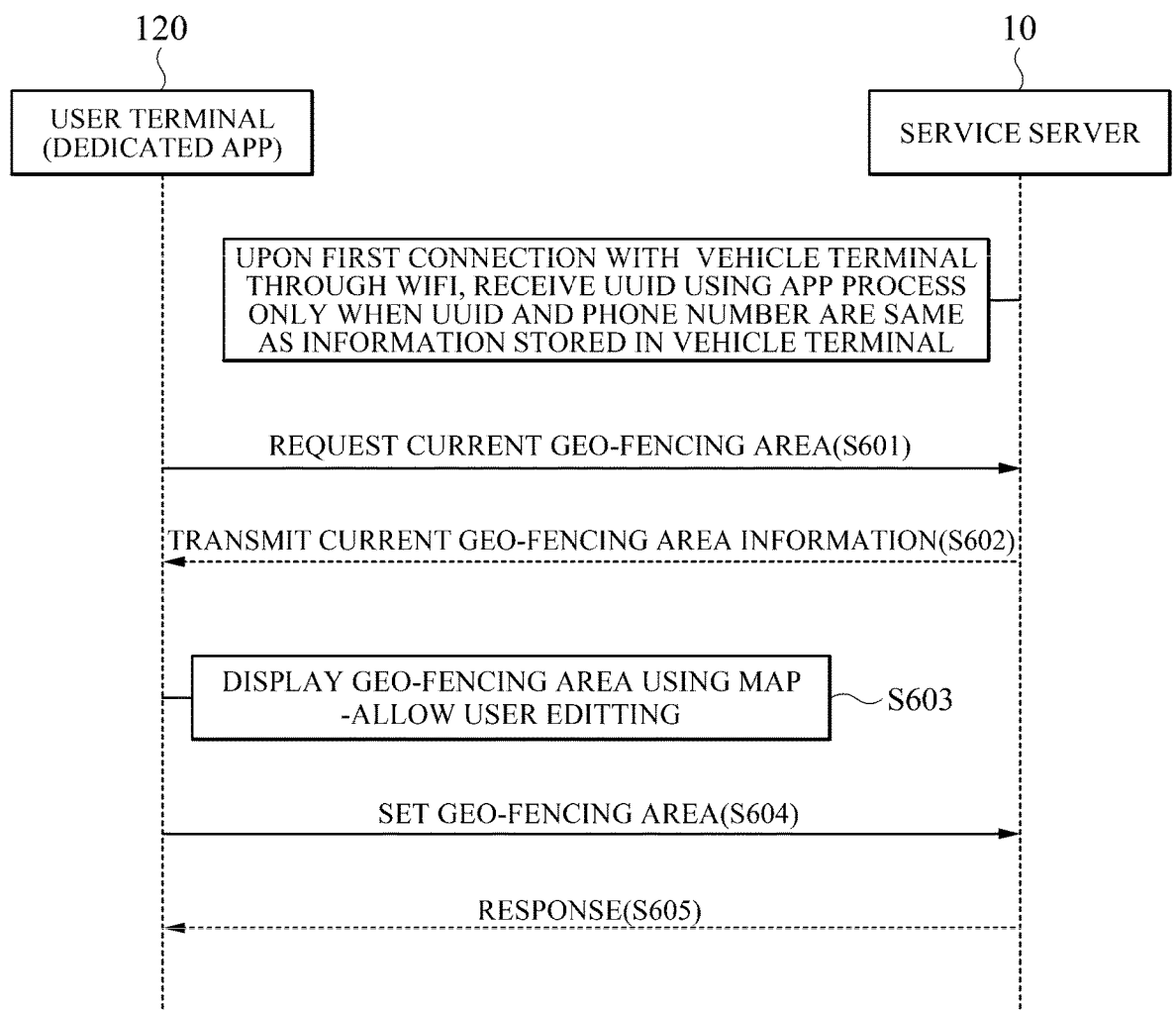
FIGS. 6 to 7 are diagrams for explaining examples of a geo-fencing process according to an embodiment of the present invention.
Figure 7:
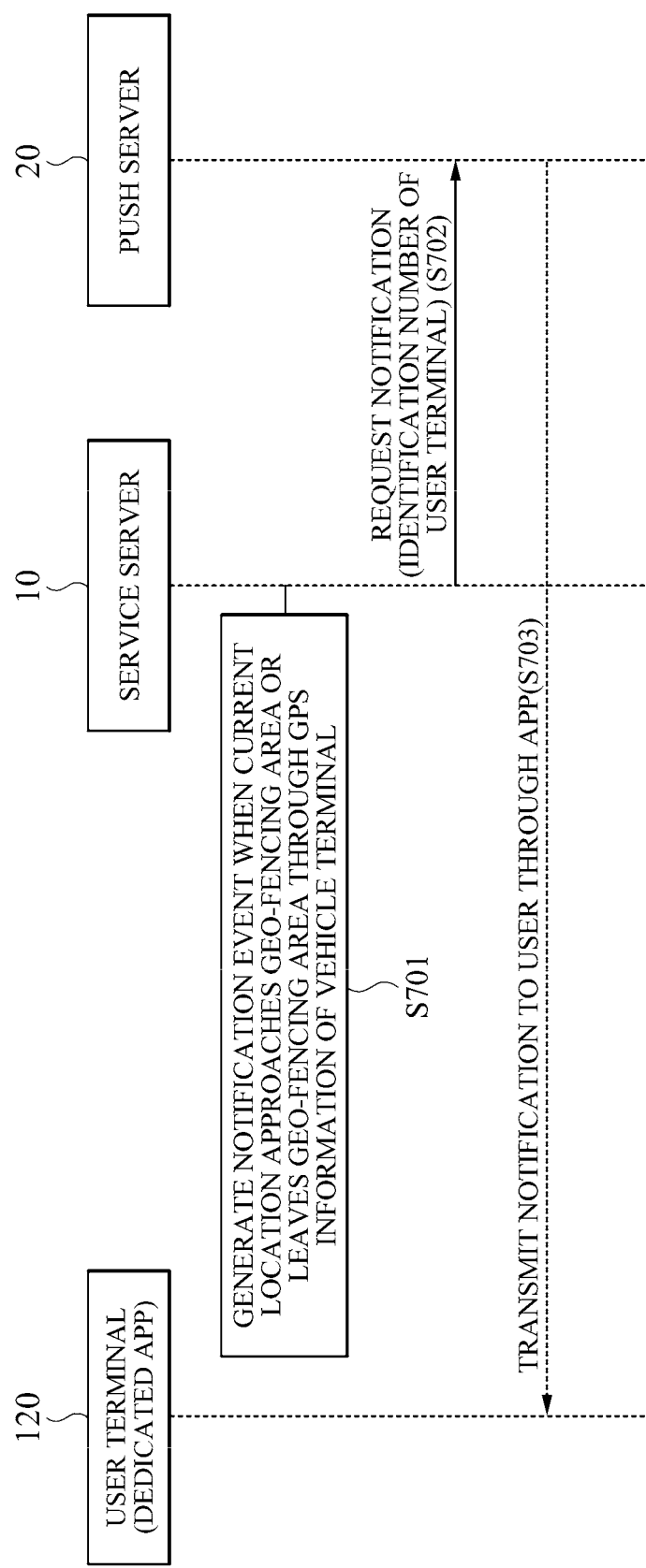

FIGS. 6 to 7 are diagrams for explaining examples of a geo-fencing process according to an embodiment of the present invention.

Geo-fencing is a technology that utilizes a location-based service (LBS) to designate a specific geographical area as a virtual fence and to notify an access status of the area.

A dedicated application on the user terminal 120 may provide a notification function for a geo-fencing area. At this time, the notification function may include a function of providing an entry notification alarm when a vehicle approaches the geo-fencing area, and a function of providing an exit notification alarm when the vehicle leaves the geo-fencing area. It is also possible to divide and set the geo-fencing area into the entry prohibition area and the exit prohibition area.

As shown in FIG. 6, the user terminal 120 may request the service server 10 to transmit information about the currently designated geo-fencing area (S601).

The service server 10 may transmit the information about the currently designated geo-fencing area to the user terminal 120 at a request of the user terminal 120 (S602).

The user terminal 120 may display the geo-fencing area on a map using the map based on the information received from the service server 10 under the control of the dedicated application (S603). At this time, the user terminal 120 may allow editing of the geo-fencing area.

Examples of an editing function for the geo-fencing area may include a function of selecting a center location and a radius to designate the geo-fencing area, a function of setting a type of notification (an entry notification or an exit notification) for the geo-fencing area, a function of setting a repetition period, a time zone and a valid period, etc. of notification for the geo-fencing area, a function of providing a geo-fencing area list and deleting a specific area selected from the list, a function of providing a geo-fencing area list and changing a radius of a selected specific area or a notification type, etc., a function of setting to stop or restart the notification for the geo-fencing area, and the like.

The user terminal 120 may transmit information about the geo-fencing area set by the user through the editing function to the service server 10 under the control of the dedicated application (S604).

The service server 10 receives and stores information about the geo-fencing area set by the user from the user terminal 120 and then transmits a response according to geo-fencing setting of the user to the user terminal 120 (S605).

The service server 10 may provide a push notification through interaction with the push server 20 when the notification for geo-fencing is necessary.

Referring to FIG. 7, the service server 10 may generate a notification event when the current location of the vehicle approaches within a predetermined distance of the geo-fencing area designated by the user or when the current location of the vehicle leaves the geo-fencing area designated by the user through the GPS information periodically received from the vehicle terminal 130 (S701).

The service server 10 may request the push server 20 to transmit the geo-fencing notification for the notification event that occurs as the current location of the vehicle approaches the geo-fencing area or leaves the geo-fencing area (S702). At this time, a notification request may include an identification number (e.g., a telephone number, etc.) of the user terminal 120.

The push server 20 may transmit the geo-fencing notification to the user through the dedicated application on the user terminal 120 in response to the notification request of the service server 10 (S703).

The user terminal 120 may exchange and store identification information (a UUID, a telephone number, etc.) between the user terminal 120 and the vehicle terminal 130 when the user terminal 120 is initially connected to the vehicle terminal 130, and when the information stored in the user terminal 120 is the same as the information stored in the vehicle terminal 130, the user terminal 120 may perform the geo-fencing process.

Figure 8:
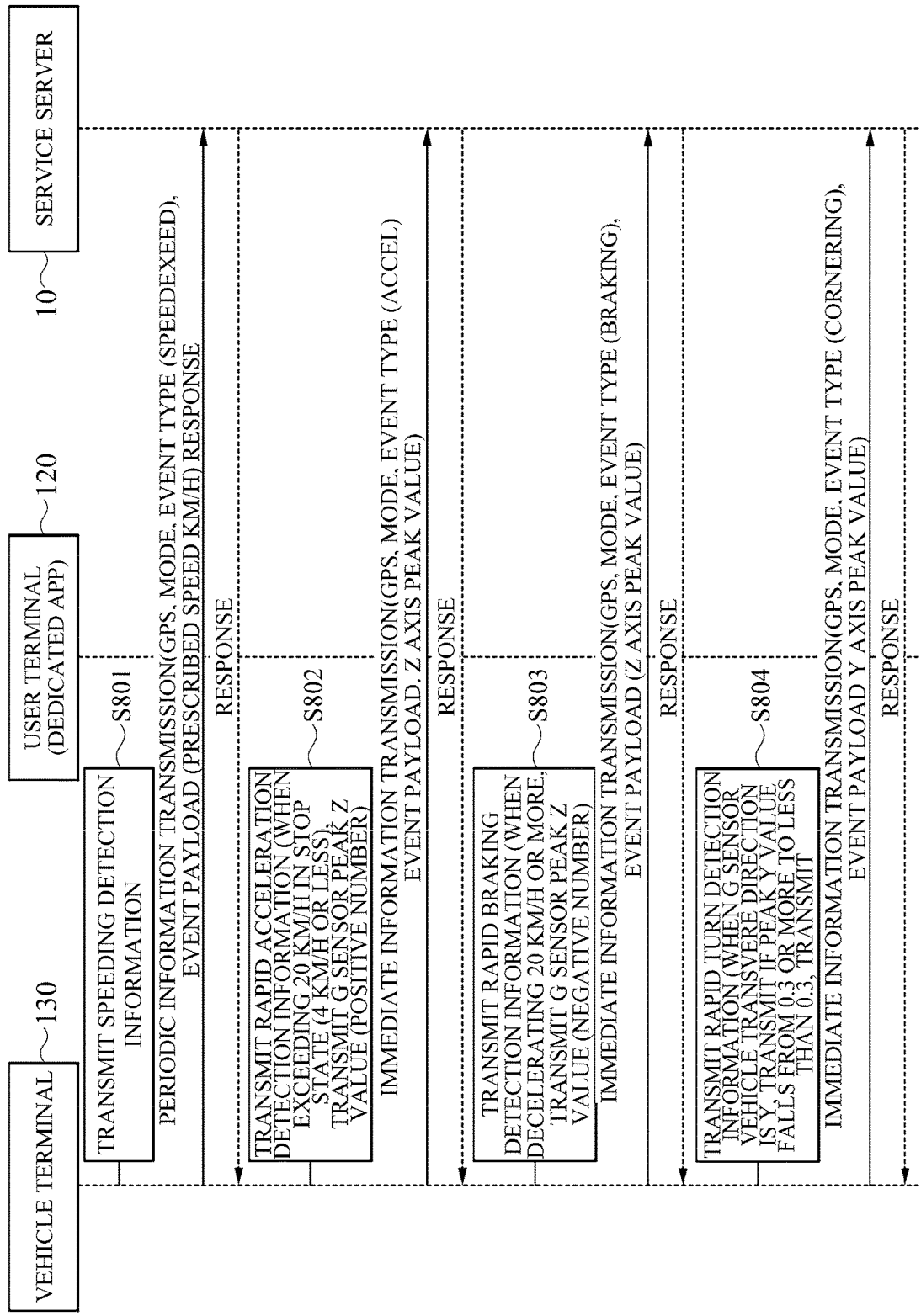
FIGS. 8 to 9 are diagrams for explaining examples of an operation report issuing process according to an embodiment of the present invention.
Figure 9:
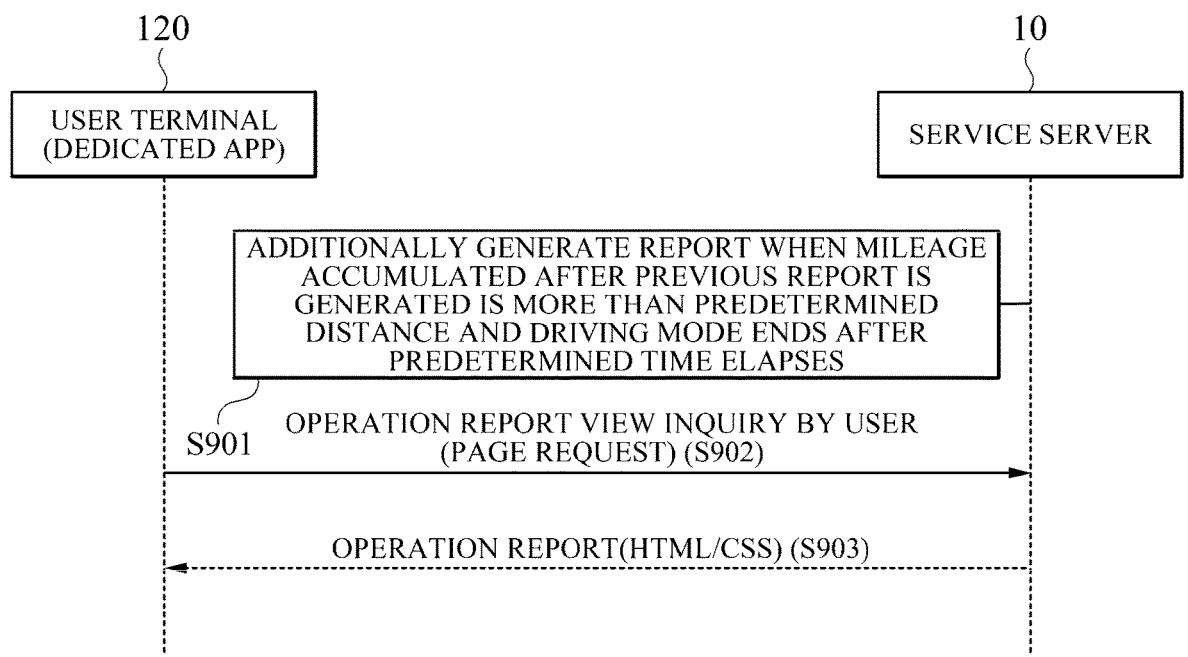

FIGS. 8 to 9 are diagrams for explaining examples of an operation report issuing process according to an embodiment of the present invention.

The service server 10 may provide an operation report based on vehicle operation data provided by the vehicle terminal 130 such that a user may confirmed the operation report through a dedicated application on the user terminal 120. For example, the vehicle terminal 130 may detect an event such as an excessive speed (speeding) of the vehicle, a rapid acceleration, a rapid braking, a rapid turn, etc., and transmit the vehicle operation data at the time of event detection to the service server 10. At this time, the service server 10 may provide a report evaluated for a vehicle operation state based on vehicle operation data accumulated for a predetermined period of time to the user through the dedicated application on the user terminal 120.

When the vehicle terminal 130 is connected to the service server 10 in a driving mode of the vehicle, the service server 10 may set a transmission period of the vehicle operation data to be shorter than another mode (e.g., a parking mode) to determine a mileage of the vehicle. For example, the service server 10 may set the vehicle terminal 130 to transmit GPS information (longitude, latitude and speed) at an interval of two seconds in the driving mode of the vehicle and may estimate the mileage of the vehicle using the GPS information collected from the vehicle terminal 130 for the operation report. At this time, the service server 10 may estimate the mileage by considering a speed change of the GPS information received from the vehicle terminal 130 as being linear. The mileage m estimated through two speed information V1 (m/s) and V2 (m/s) received when receiving the GPS speed every 2 seconds may be defined as {(V1+V2)/2}×2 (s). Also, the service server 10 may estimate the mileage by connecting adjacent points with the GPS speed and a location value in a straight line in a GPS shade section such as a tunnel, etc. where the GPS speed and location may not be measured.

In the present embodiment, the vehicle terminal 130 may periodically transmit the GPS information including the speed information to the service server 10 without being connected to vehicle OBD (On Board Diagnostics), and the service server 10 may estimate the mileage of the vehicle using GPS speed information received from the vehicle terminal 130.

Referring to FIG. 8, the vehicle terminal 130 may transmit speeding detection information to the service server 10 as a speeding event occurs when the vehicle exceeds a prescribed speed, which is the speed limit on the road (S801). For example, the vehicle terminal 130 may transmit the speeding detection information in the form of periodic information transmission, and may transmit the speeding detection information included in the periodically transmitted vehicle operation data to the service server 10. At this time, the vehicle operation data may include information about the speeding event as an event type, and information about the prescribed speed and the excessive speed as the speeding detection information.

When the vehicle reaches a set speed (for example, 20 km/h) within a predetermined time in a stop state (for example, 4 km/h or less), as a rapid acceleration event occurs, the vehicle terminal 130 may transmit rapid acceleration detection information to the service server 10 (S802). For example, the vehicle terminal 130 may transmit the rapid acceleration detection information in the form of immediate information transmission. The vehicle terminal 130 may connect to the service server 10 at the time of occurrence of the rapid acceleration event and transmit the vehicle operation data including the rapid acceleration detection information to the service server 10. At this time, the vehicle operation data may include information about the rapid acceleration event as an event type and an acceleration sensor value, for example, a Z axis maximum peak value when a Z axis direction of a G sensor is assumed to be a +direction when the vehicle is accelerated as the rapid acceleration detection information.

When the vehicle falls below a set speed (for example, 4 km/h) within a predetermined time in a running state (for example, 20 km/h or more), as the rapid braking event occurs, the vehicle terminal 130 may transmit the rapid braking detection information to the service server 10 (S803). For example, the vehicle terminal 130 may transmit the rapid braking detection information in the form of immediate information transmission. The vehicle terminal 130 may connect to the service server 10 at the time of occurrence of the rapid braking event and transmit the vehicle operation data including the rapid braking detection information to the service server 10. At this time, the vehicle operation data may include the information about the rapid braking event as the event type and an acceleration sensor value, for example, a Z axis minimum peak value when a Z axis direction of a G sensor is assumed to be a −direction when the vehicle is decelerated as the rapid braking detection information.

The vehicle terminal 130 may transmit rapid turn detection information to the service server 10 as a rapid turn event occurs when an acceleration sensor value for a lateral direction of the vehicle falls a set level or below within a predetermined time in the running state of the vehicle (S804). For example, assuming that a Y axis direction of the G sensor is the lateral direction of the vehicle, the vehicle terminal 130 may determine a rapid turn if a Y axis peak value (an absolute value) of the G sensor falls below 0.3 within a predetermined time from 0.3 or more. For example, the vehicle terminal 130 may transmit the rapid turn detection information in the form of immediate information transmission. The vehicle terminal 130 may connect to the service server 10 at the time of occurrence of the rapid turn event and transmit the vehicle operation data including the rapid turn detection information to the service server 10. At this time, the vehicle operation data may include information about the rapid turn event as the event type and an acceleration sensor value, for example, the Y axis peak value (the absolute value) of the G sensor as the rapid turn detection information.

When the service server 10 receives the vehicle operation data (the speeding detection information, the rapid acceleration detection information, the rapid braking detection information, and the rapid turn detection information) from the vehicle terminal 130 periodically or immediately upon occurrence of an event, the service server 10 may transmit a response to reception of the corresponding data to the vehicle terminal 130.

The service server 10 may provide the operation report based on the vehicle operation data provided by the vehicle terminal 130.

Referring to FIG. 9, the service server 10 may periodically generate the operation report based on the vehicle operation data provided by the vehicle terminal 130. For example, the service server 10 may additionally generate a report when a condition (a time condition) in which a predetermined time (for example, 7 days) elapses after a previous report is generated and a condition (a distance condition) in which the mileage of the vehicle is accumulated more than a predetermined distance (for example, 60 km) are all satisfied (S901). The present invention is not limited to this, and the service server 10 may also additionally generate the report when any one of the time condition and the distance condition is satisfied.

The user terminal 120 may request the service server 10 to transmit an operation report view inquiry by the user when the user inquires the operation report through the dedicated application (S902).

The service server 10 may provide the operation report to the user through the dedicated application on the user terminal 120 in response to a request of the user terminal 120 (S903).

The service server 10 may generate a report related to the speeding of the vehicle. For example, (1) the service server 10 may provide a report rated as Good when there is no history of exceeding the speed limit while vehicle is running at 60 km; (2) the service server 10 may provide a report rated as Okay if there is no history of exceeding the speed limit at a point where a speeding safety camera is located while vehicle is running at 60 km; (3) the service server 10 may provide a report rated as Need Improvement if there is a history of exceeding the speed limit at the point where the speeding safety camera is located while vehicle is running at 60 km and an average exceeding speed is less than 10 km/h; (4) the service server 10 may provide a report rated as Unsafe if there is a history of exceeding the speed limit at the point where the speeding safety camera is located while vehicle is running at 60 km and the average exceeding speed is more than 10 km/h and less than 20 km/h; and (5) the service server 10 may provide a report rated as Dangerous if there is a history of exceeding the speed limit at the point where the speeding safety camera is located while vehicle is running at 60 km and the average exceeding speed is more than 20 km/h in the accumulated mileage. The service server 10 may provide a speed rating message corresponding to the above rating levels (good, okay, need improvement, unsafe and dangerous) as the report related to the speeding of the vehicle.

The service server 10 may generate a report related to rapid acceleration of the vehicle. For example, (1) the service server 10 may provide a report rated as Good when all the Z-axis maximum peak values of the G sensor collected while vehicle is running of 60 km are less than 0.4 g; (2) the service server 10 may provide a report rated as Okay when all the Z-axis maximum peak values of the G sensor collected while vehicle is running of 60 km do not exceed 0.7 g; (3) the service server 10 may provide a report rated as Need Improvement when the peak values exceeding 0.7 g in the Z-axis maximum peak values of the G sensor collected while vehicle is running of 60 km are less than 0.1%; (4) the service server 10 may provide a report rated as Unsafe when the peak values exceeding 0.7 g in the Z-axis maximum peak values of the G sensor collected while vehicle is running of 60 km are 0.1% or more and less than 1%; (5) the service server 10 may provide a report rated as dangerous when the peak values exceeding 0.7 g in the Z-axis maximum peak values of the G sensor collected while vehicle is running of 60 km are 1% or more, or the Z-axis maximum peak value of the G sensor is 0.8 g or more. The service server 10 may provide an acceleration rating message corresponding to the above rating levels (good, okay, need improvement, unsafe and dangerous) as the report related to the rapid acceleration of the vehicle.

The service server 10 may generate a report related to the rapid braking of the vehicle. For example, (1) the service server 10 may provide a report rated as Good when the Z-axis minimum peak values of the G sensor collected while vehicle is running of 60 km are −0.4 g or more; (2) the service server 10 may provide a report rated as Okay when the peak values satisfying a condition of −0.3 g≥Z axis peak value>−0.6 g among the Z-axis peak values of the G sensor collected while vehicle is running of 60 km are 1 or 2; (3) the service server 10 may provide a report rated as Need Improvement when the peak values satisfying a condition of −0.3 g≥Z-axis peak value>−0.6 g among the Z-axis peak values of the G sensor collected while vehicle is running of 60 km are 3; (4) the service server 10 may provide a report rated as Unsafe when the peak values satisfying a condition of −0.3 g≥Z-axis peak value>−0.6 g among the Z-axis peak values of the G sensor collected while vehicle is running of 60 km are 4 or more; and (5) the service server 10 may provide a report rated as dangerous when the peak values satisfying a condition of −0.3 g≥Z-axis peak value>−0.6 g among the Z-axis peak values of the G sensor collected while vehicle is running of 60 km are 4 or more and a peak value of −0.8 g or less is present. The service server 10 may provide a braking rating message corresponding to the above rating levels (good, okay, need improvement, unsafe and dangerous) as the report related to the rapid braking of the vehicle.

The service server 10 may generate a report related to the rapid turn of the vehicle. For example, (1) the service server 10 may provide a report rated as Good when a ratio of 0.6 g≤|y-value| is less than 0.5% and there is no peak value of 0.7 g≤|y-value| among Y-axis peak values (absolute values) of the G sensor collected while vehicle is running of 60 km; (2) the service server 10 may provide a report rated as Okay when the ratio of 0.6 g≤| y-value| is less than 0.8% and there is no peak value of 0.7 g≤|y-value| among the Y-axis peak values (absolute values) of the G sensor collected while vehicle is running of 60 km; (3) the service server 10 may provide a report rated as Need Improvement when the ratio of 0.6 g≤|y-value| is more than 0.8% and there is no peak value of 0.7 g≤|y-value| among the Y-axis peak values (absolute values) of the G sensor collected while vehicle is running of 60 km; (4) the service server 10 may provide a report rated as Unsafe when the ratio of 0.6 g≤|y-value| is more than 0.8% and there is a peak value of 0.7 g≤|y-value| among the Y-axis peak values (absolute values) of the G sensor collected while vehicle is running of 60 km; and (5) the service server 10 may provide a report rated as dangerous when the ratio of 0.6 g≤|y-value| is more than 0.8% and there is a peak value of 0.8 g≤|y-value| among the Y-axis peak values (absolute values) of the G sensor collected while vehicle is running of 60 km. The service server 10 may provide a cornering rating message corresponding to the above rating levels (good, okay, need improvement, unsafe and dangerous) as the report related to the rapid turn of the vehicle.

Accordingly, the vehicle terminal 130 may detect the speeding, rapid acceleration, rapid braking, and rapid turn of the vehicle and transmit the vehicle operation data including detected information to the service server 10, and in response thereto, the service server 10 may periodically generate the operation report based on the vehicle operation data provided by the user terminal 130 to provide the operation report to the user through the dedicated application on the user terminal 120.

In the above description, the vehicle terminal 130 detects a speeding event, a rapid acceleration event, a rapid braking event, a rapid turn event, etc., and transmits the vehicle operation data including information corresponding to the corresponding event to the service server 10, but is not limited thereto. As another example, it is possible for the service server 10 to also directly determine the speeding, rapid acceleration, rapid braking, and rapid turn of the vehicle based on the vehicle operation data periodically received from the vehicle terminal 130.

FIG. 10 is a diagram for explaining an example of a parking impact notification process according to an embodiment of the present invention.

Referring to FIG. 10, when an impact is detected in a parking mode, as the parking shock event occurs, the vehicle terminal 130 may transmit impact detection information to the service server 10 (S1001). When an impact recording or an intelligent impact detection occurs in the parking mode, the vehicle terminal 130 may determine the impact recording or the intelligent impact detection as a minor accident possibility and notify the service server 10 of the same. At this time, the vehicle terminal 130 may distinguish an impact strength (for example, a strong impact, a weak impact, etc.) and an impact location (for example, a right rear or side, a left rear or side, etc.) with respect to a peak value of a G sensor at a time when a parking impact event occurs. For example, the vehicle terminal 130 may transmit the impact detection information in the form of immediate information transmission. When the impact event occurs, the vehicle terminal 130 may connect to the service server 10 and transmit vehicle operation data including the impact detection information to the service server 10. An information transmission method is not limited to the form of immediate information transmission, and it is also possible for the vehicle terminal 130 to transmit the impact detection information in the form of periodic information transmission. At this time, the vehicle operation data includes information about the parking impact event as an event type, and an acceleration sensor value, for example, a peak value of the G sensor, an impact strength, an impact location, etc. as the impact detection information.

When the service server 10 receives the vehicle operation data from the vehicle terminal 130, the service server 10 may request the push server 20 to transmit a parking impact notification when the event type is a parking impact event with respect to the event type included in the vehicle operation data (S1002). At this time, a notification request may include an identification number (e.g., a telephone number, etc.) of the user terminal 120, and may include the impact strength, the impact location, the peak value of the G sensor, etc. as the impact detection information.

The push server 20 may transmit the parking impact notification to the user through a dedicated application on the user terminal 120 according to the notification request of the service server 10 (S1003). The parking impact notification may include the impact strength and the impact location, and a character string indicating the impact strength based on the peak value of the G sensor.

Accordingly, the service server 10 may immediately transmit the parking impact notification to the dedicated application on the user terminal 120 through the push server 20 when the parking impact event generated in the parking mode of the vehicle is received from the vehicle terminal 130.

Furthermore, the vehicle terminal 130 may transmit an impact recording image to the service server 10 when the parking impact event occurs. As another example, when the parking impact event is detected, the service server 10 may also request the vehicle terminal 130 to transmit the impact recording image and receive the impact recording image in the same manner as described shown in FIG. 4. Accordingly, the service server 10 may transmit the impact recording image to the user through the dedicated application on the user terminal 120 together with the parking impact notification. The user may directly play and check a file in which the corresponding event has occurred without selecting the file by the parking impact notification received through the dedicated application on the user terminal 120. It is also possible to provide a live image of the vehicle as well as a recording image at the time of occurrence of the parking impact event. For example, it may support live streaming or playback of a recorded image for a vehicle surrounding image at the time of occurrence of the parking impact event between the vehicle terminal 130, the service server 10, and the user terminal 120 through a real time protocol (RTP) or a real time streaming protocol (RTSP).

FIG. 11 is a diagram for explaining an example of an emergency notification process according to an embodiment of the present invention.

Referring to FIG. 11, the service server 10 may store an emergency contact set through a dedicated application on the user terminal 120 (S1101). The emergency contact may include a telephone number of a guardian who is desired to be contacted by a user in case of occurrence of an emergency of the vehicle or a telephone number (for example, 112, 119, etc.) of an emergency reporting agency. The dedicated application may provide a function of registering the emergency contact in conjunction with an address book or a search function on the user terminal 120.

The vehicle terminal 130 may transmit emergency information to the service server 10 when an emergency event, which is an accident occurrence event, occurs in a driving mode (S1102). The emergency may include a case where the user personally inputs a rescue request (SOS) button provided on the vehicle terminal 130, a case where the vehicle collides while vehicle is running (e.g., when a peak value of 2 g or more is detected as a vector sum of a G sensor), a case where the vehicle has fallen (e.g., when the vehicle has fallen more than 30 m within 0.25 seconds), a case where the vehicle has rolled over while vehicle is running (e.g., when there is no vehicle speed and the vehicle has tilted more than 40 degrees with respect to a normal gravity direction), etc. For example, the vehicle terminal 130 may transmit the emergency information in the form of immediate information transmission. When the emergency event occurs, the vehicle terminal 130 may connect to the service server 10 and transmit vehicle operation data including the emergency information to the service server 10. At this time, the vehicle operation data may include information about the emergency event (an SOS button, collision, fall, rollover, etc.) as an event type, and an while vehicle is running speed before a predetermined time (e.g., 1 second), an acceleration sensor value (e.g., the vector sum of the G sensor), etc. as the emergency information. For example, when the vehicle collides and then turns over, a sequential emergency event occurs. Therefore, the vehicle terminal 130 may transmit the vehicle operation data including the emergency information according to the collision to the service server 10 and then immediately, transmit the vehicle operation data including the emergency information according to rollover to the service server 10 subsequently.

When the service server 10 receives the vehicle operation data from the vehicle terminal 130, the service server 10 transmits a notification request for a time period (for example, 10 seconds) during which an emergency cancellation is possible when an event type is an emergency event with respect to the event type included in the vehicle operation data to the vehicle terminal 130 and simultaneously starts a wait count for emergency cancellation (S1103).

The vehicle terminal 130 starts voice expression for the wait count for emergency cancellation for the time period (for example, 10 seconds) in which the emergency cancellation is possible in accordance with the notification request of the service server 10 (S1104). For example, the vehicle terminal 130 may output a message "The emergency has been detected. The emergency is to be notified of the emergency contact. Press any button within 10 seconds if you want to cancel" and then count every one second until "10, 9, 8, 7, 6, 5, 4, 3, 2, 1" and output a voice message "canceled" when there is a button input during counting.

The vehicle terminal 130 may transmit a cancellation request for the emergency to the service server 10 when the user inputs a certain button during counting, and the service server 10 may recognize this as a manual cancellation by the user, stop the wait count for emergency cancellation, and terminate the emergency notification process.

As another example, the service server 10 periodically receives the vehicle operation data from the vehicle terminal 130 while performing the wait count for emergency cancellation. At this time, when the service server 10 determines that the vehicle is running more than a predetermined speed (e.g., 10 km/h) based on GPS information included in the vehicle operation data, the service server 10 may automatically cancel the emergency of the vehicle to stop the wait count for emergency cancellation and terminate the emergency notification process.

The service server 10 may transmit a text notification as the emergency notification to the emergency contact when the emergency of the vehicle is not manually canceled or automatically canceled until the wait count for emergency cancellation terminates (S1105). At this time, the service server 10 may transmit an emergency contact list registered in advance and detailed information related to the emergency to an SMS server 30 for the text notification for the emergency of the vehicle (S1106).

In this regard, based on the information received from the service server 10, the SMS server 30 may transmit a message including the detailed information related to the emergency to the emergency contact registered in advance by the user with respect to the emergency of the vehicle (S1107). When the wait count for emergency cancellation terminates, that is, when there is no button input until the end of counting, the vehicle terminal 130 may also output a voice message "the emergency contact has been contacted" (S1108).

The information included in the message may include a telephone number of the user of the vehicle and text informing the emergency of the vehicle. For example, the text may be configured as "Emergency occurred as [Manual SOS| Collision| Turnover| Fall]. detailed information: Short URL". At this time, information on a page referenced by Short URL may include the detailed information provided by the service server 10, and the detailed information may include a location (map) and a time at which the emergency occurred, a type (manual SOS, collision, fall, rollover, etc.) of the emergency, a speed of the vehicle just before occurrence of the emergency, magnitude of an impact, etc. For example, if the maximum peak value of a G sensor detected at 1 second before and after time of the occurrence of the emergency is 2 g or more and less than 2.5 g, the magnitude of the impact may be defined to be 'weak', if the maximum peak value is 2.5 g or more and less than 3 g, the magnitude of the impact may be defined to be 'normal', and if the maximum peak value is 3 g or more, the magnitude of the impact may be defined to be 'strong'.

Accordingly, when the emergency of the vehicle occurs, it is also possible for the service server 10 to transmit a message including the detailed information of the emergency to a guardian using the emergency contact registered in advance or automatically process a report for the emergency of the vehicle to an emergency reporting agency.

In the above description, it is described that the vehicle terminal 130 determines the emergency such as collision, fall, rollover, etc. in the driving mode of the vehicle but is not limited thereto. It is also possible for the service server 10 to directly determine the emergency of the vehicle based on the vehicle operation data received periodically from the vehicle terminal 130. Also, it is described that a message in a text format is transmitted through the SMS server 30 for the emergency of the vehicle, but is not limited thereto. However, in order to become more quick and aggressive, it is also possible to send a voice call to transmit the detailed information of the emergency to the emergency contact in conjunction with automatic response system (ARS), etc.

As described above, according to the embodiments of the present invention, it is possible to more precisely and specifically understand a vehicle operation state by integratedly managing the vehicle operation state including an operation report of a vehicle, a parking impact or an emergency, etc., and it is possible to further appropriately and quickly take a measure corresponding to the vehicle operation state.

The device described above may be implemented as a hardware component, a software component, and/or a combination of hardware components and software components. For example, the device and components described in the embodiments may be implemented using one or more general purpose computer or a special purpose computer like a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications executed on the operating system. The processing device may also access, store, manipulate, process, and generate data in response to execution of the software. For ease of understanding, it is described that one processing device is used, but those skilled in the art will recognize that the processing device may include a plurality of processing elements and/or a plurality of types of processing elements. For example, the processing device may include a plurality of processors or one processor and one controller. Other processing configuration is also possible, such as a parallel processor.

The software may include a computer program, code, instructions, or a combination of one or more of the foregoing, and may configure the processing device to operate as desired or instruct the processing device independently or collectively. The software and/or data may be embodied in any type of machine, a component, a physical device, virtual equipment, computer storage media, or a device, in order to be construed by the processing device or provide instruction or data to the processing device. The software may be distributed over a computer system connected over a network and stored or executed in a distributed manner. The software and data may be stored on one or more computer readable recording media.

The method according to an embodiment may be implemented in the form of a program instruction that may be executed through various computer means and recorded in a computer-readable medium. At this time, the medium may continuously store a computer readable program, or temporarily store the computer readable program for execution or downloading. Further, the medium may be a variety of recording means or storage means in the form of a single hardware or a combination of a plurality of hardware, but is not limited to a medium directly connected to any computer system, but may be distributed on a network. Examples of the medium include a magnetic medium such as a hard disk, a floppy disk and a magnetic tape, an optical recording medium such as CD-ROM and DVD, a magneto-optical medium such as a floptical disk, ROM, RAM, flash memory, and the like such that program instructions are configured to be stored. Other examples of the medium may include a recording medium or a storage medium that is managed by an application store that distributes applications or a site, a server, etc. that supply or distribute various other software.

While the embodiments have been described and shown with reference to the limited embodiments and drawings as above, various corrections and modifications may be possible from the above description by one of ordinary skill in the art. For example, an appropriate result may be achieved even though the described technologies may be performed in a different order from the described methods, and/or components of the described systems, structures, devices, circuits, etc. are combined or coupled in a different form from the described methods, or are replaced or substituted by other components or equivalents.

Therefore, other implementations, other embodiments, and equivalents to the claims are also within the scope of the following claims.

The invention claimed is:

1. A method for providing an emergency notification of a server, the method comprising:
   receiving an emergency information from a vehicle terminal for a vehicle when an emergency event occurs in the vehicle;
   starting a wait count for emergency cancellation for the vehicle terminal;
   determining whether it is an emergency according to whether the emergency cancellation is requested until the wait count terminates;
   processing a report for the emergency of the vehicle to an emergency reporting agency using the received emergency information if it is determined that it is the emergency, and
   wherein the wait count for the emergency cancellation is counted by the server and the vehicle terminal.

2. The method of claim 1,
   wherein the emergency event is occurred if a rescue request (SOS) button provided on the vehicle terminal is input.

3. The method of claim 1,
   wherein the emergency event is occurred if a collision of the vehicle, a falling of the vehicle and a rollover of the vehicle is detected.

4. The method of claim 1,
   wherein the emergency information includes at least two of identification information, event type information representing a type of the emergency event, location information, running speed information before a predetermined time, and acceleration sensor value information.

5. The method of claim 1, further comprising:
   receiving a cancellation request for the emergency from the vehicle terminal if a user's cancellation is made until the wait count terminates; and
   terminating an emergency notification process if the cancellation request is received.

6. The method of claim 1,
   wherein the processing the report comprising:
   sending a voice call to transmit the emergency information to the emergency reporting agency in conjunction with automatic response system (ARS).

7. A method for providing an emergency notification of a vehicle terminal, the method comprising:
   determining whether an emergency event of a vehicle occurs;
   generating an emergency information when the emergency event occurs, and transmitting the generated emergency information to a server;
   outputting an occurrence of the emergency event, and outputting a wait count for emergency cancellation; and
   transmitting an emergency cancellation request to the server if the emergency cancellation request is input from a user until the wait count terminates,
   wherein the wait count for the emergency cancellation is counted by the server and the vehicle terminal.

8. The method of claim 7, further comprising:
   determining that it is an emergency if the emergency cancellation request is not input from the user until the wait count for canceling the emergency terminates.

9. The method of claim 7,
   wherein the determining determines that the emergency event occurs if a rescue request (SOS) button provided on the vehicle terminal is input by a user.

10. The method of claim 7,
    wherein the determining determines that the emergency event occurs if a collision of the vehicle, a falling of the vehicle and a rollover of the vehicle is detected.

11. The method of claim 7,
    wherein the emergency information includes at least two of identification information, event type information representing a type of the emergency event, location information, running speed information before a predetermined time, and acceleration sensor value information.

12. A server comprising:
a communication unit that receives an emergency information from a vehicle terminal for a vehicle when an emergency event occurs in the vehicle; and
a controller that starts a wait count for emergency cancellation for the vehicle terminal and determines whether it is an emergency according to whether the emergency cancellation is requested until the wait count terminates,
wherein the controller processes a report for the emergency of the vehicle to an emergency reporting agency using the received emergency information if it is determined that it is the emergency, and
wherein the wait count for the emergency cancellation is counted by the server and the vehicle terminal.

13. The server of claim 12,
wherein the emergency event is occurred if a rescue request (SOS) button provided on the vehicle terminal is input.

14. The server of claim 12,
wherein the emergency event is occurred if a collision of the vehicle, a falling of the vehicle and a rollover of the vehicle is detected.

15. The server of claim 12,
wherein the emergency information includes at least two of identification information, event type information representing a type of the emergency event, location information, running speed information before a predetermined time, and acceleration sensor value information.

16. The server of claim 12,
wherein the communication unit receives a cancellation request for the emergency from the vehicle terminal if a user's cancellation is made until the wait count terminates, and
wherein the controller terminates an emergency notification process if the cancellation request is received.

17. The server of claim 12,
wherein the controller sends a voice call to transmit the emergency information to the emergency reporting agency in conjunction with automatic response system (ARS).

* * * * *